United States Patent [19]
Dutton

[11] 3,865,406
[45] Feb. 11, 1975

[54] QUICK CHANGE HITCH FOR TRAILER OR MOBILE HOMES

[75] Inventor: Lawrence D. Dutton, Meridian, Miss.

[73] Assignee: Truck Specialist Inc., Meridian, Miss.

[22] Filed: May 31, 1974

[21] Appl. No.: 475,256

[52] U.S. Cl. .............................................. 280/490 R
[51] Int. Cl. ............................................... B60p 3/06
[58] Field of Search ................. 280/490 R, 456, 467

[56] References Cited
UNITED STATES PATENTS

| | | | |
|---|---|---|---|
| 3,191,966 | 6/1965 | Felburn | 280/407 |
| 3,254,903 | 6/1966 | Rodney | 280/407 |
| 3,269,751 | 8/1966 | Whatoff | 280/490 R X |
| 3,400,949 | 9/1968 | Kendall | 280/490 R |
| 3,655,221 | 4/1972 | Warner | 280/490 R |
| 3,692,330 | 9/1972 | Kendall | 280/490 R |
| 3,708,193 | 1/1973 | Jones | 280/490 R |

Primary Examiner—Leo Friaglia
Attorney, Agent, or Firm—Mason, Fenwick & Lawrence

[57] ABSTRACT

A quick change trailer hitch for coupling mobile homes to towing vehicles comprising a standard hitch ball attached to a vertically movable rack gear section engageable at various heights above the ground with a horizontally movable gear plate having a locking means.

10 Claims, 5 Drawing Figures

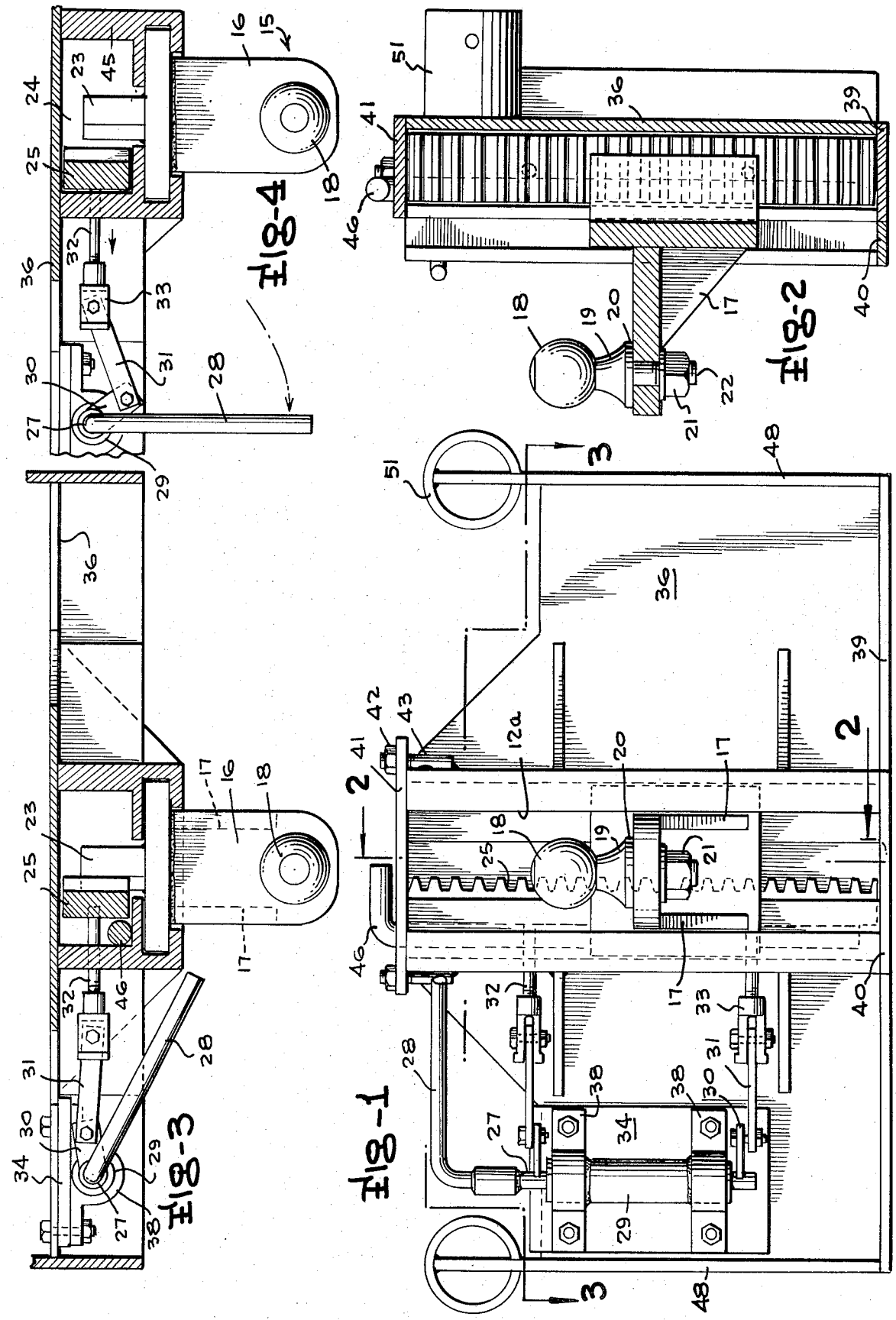

QUICK CHANGE HITCH FOR TRAILER OR MOBILE HOMES

BACKGROUND AND OBJECTS OF THE INVENTION

The present invention relates in general to vehicle coupling devices and more particularly to a trailer hitch for coupling mobile homes to towing vehicles.

Since the hitches on mobile homes are positioned at varying heights above the ground it is essential to have a vertically adjustable hitch on towing vehicles used to tow various mobile homes. Prior art hitches which are vertically adjustable have not achieved the standard of safety and ease of maintenance and use desired by mobile home haulers.

A primary object of this invention is to provide a trailer hitch which can be easily and quickly adjusted in a vertical direction.

Another object of the present invention is to provide a trailer hitch which can be adjusted in vertical height without the use of additional tools.

An additional object of the present invention is to provide a vertically adjustable trailer hitch which will not permit the trailer to separate from the towing vehicle even if a height adjusting means and safety features are improperly assembled or are damaged in an accident.

A further object of the present invention is to provide a safe, reliable and economical trailer hitch which is vertically adjustable.

These and other objects of the present invention will become apparent from the following description taken in conjunction with the accompanying drawings.

BRIEF DESCRIPTION OF THE FIGURES

FIG. 1 is a front elevation of a preferred embodiment of the present invention showing the quick change hitch locked in an intermediate height position.

FIG. 2 is a sectional view of the preferred embodiment taken along line 2—2 in FIG. 1.

FIG. 3 is a sectional view of the preferred embodiment of the present invention taken along line 3—3 in FIG. 1.

FIG. 4 is a fragmentary section view taken along the section plane identified by line 3—3 of FIG. 1 but showing the quick change hitch in the unlocked position.

DETAILED DESCRIPTION OF A PREFERRED EMBODIMENT

Figure 5:
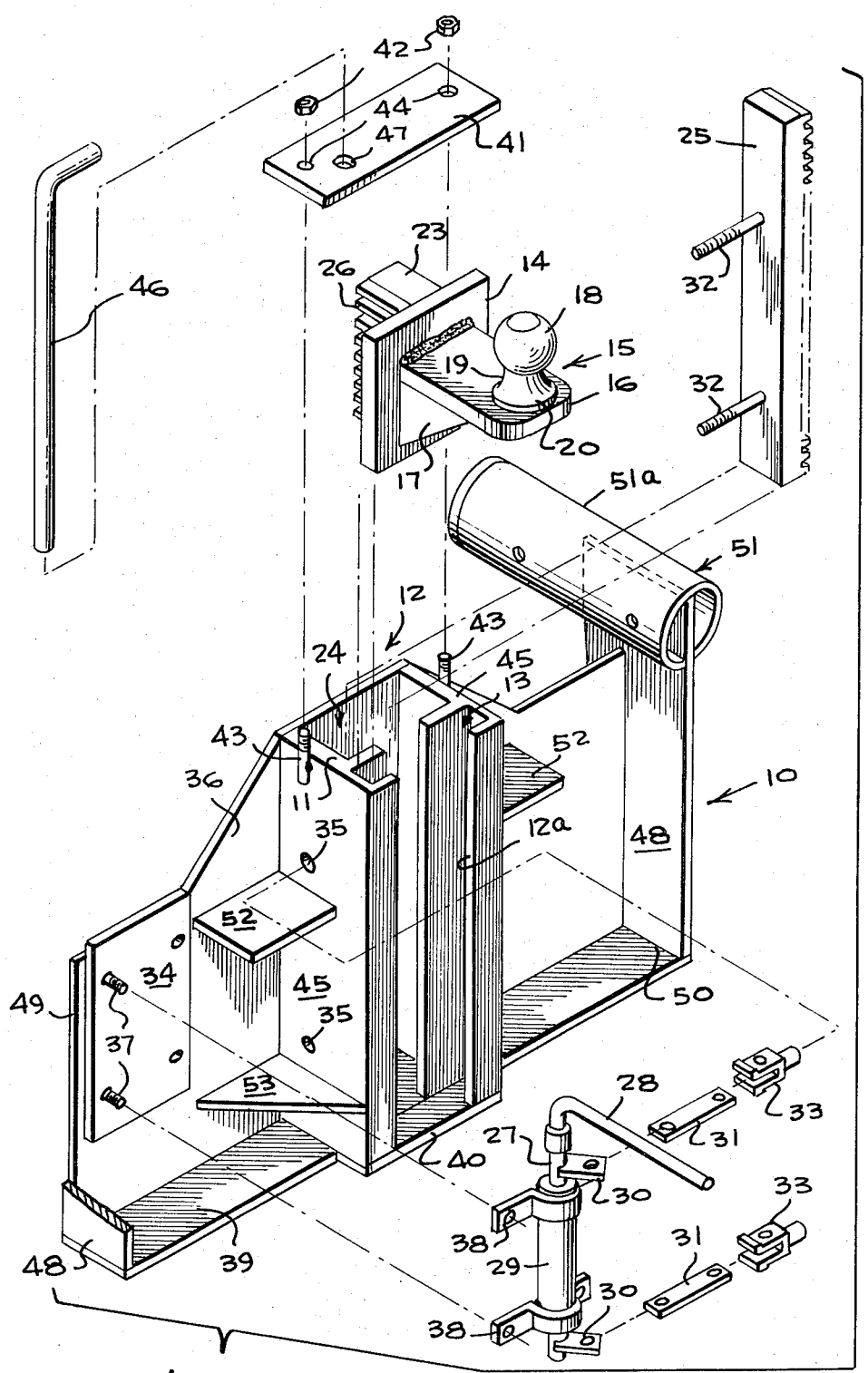
FIG. 5 is an exploded perspective view of the quick change hitch.

Referring now to FIGS. 1 through 5 and particularly FIG. 5, a preferred embodiment of the quick change hitch indicated by the reference character 10, includes a vertical slide box 11 formed of 1-inch thick welded steel plates and defining a slideway 12, which opens rearwardly, when considered relative to the towing vehicle, having adjacent the rear opening 12a of the slideway a rearmost channel section 13 in which a slide plate 14 of a ball assembly 15 slides.

The slide plate 14 fits closely within channel section 13 thereby permitting vertical movement of the ball assembly 15 while preventing any rotation of the ball assembly. The ball assembly 15 comprises a ball stand plate 16, two ball stand plate brackets 17 and a standard hitch ball 18. The ball stand plate 16, formed of 1-inch steel plate and welded to the face of slide plate 14, is reinforced by the two ball stand plate brackets or gussets 17 formed of 1-inch steel plate and welded to the bottom of the ball stand plate 16 and the face of the slide plate 14 as shown in FIGS. 1, 2 and 5. The hitch ball 18 has a pedestal 19 with outwardly projecting flange 20 which seats against the ball stand plate 16 and is locked in position by nut 21 threaded on stud portion 22 inserted through a hole in the ball stand plate 16.

A rack gear section 23 projects forwardly from the slide plate 14 into the forwardmost channel section 24 of the slideway 12 and is engageable by the teeth of horizontally movable gear plate 25 located adjacent one side of the forward slideway channel section 24. Gear plate 25 is movable transversely of the fore-and-aft axis of the towing vehicle to interlock with teeth 26 on the rack gear section 23 or be released therefrom.

The lateral movement of the movable gear plate 25 to and from a locking position as shown in FIGS. 3 and 4, is controlled by locking rod 27 having handle 28 and rotatable in a bearing 29. The locking rod 27 has radial lugs 30 fixed to the rod 27 which are connected by locking links 31 to clevises 33 threaded on studs 32 extending from the movable gear plate 25. The radial lugs 30 as viewed in FIG. 3 are displaced counter-clockwise angularly from the extended center axis of the studs 32 thereby providing a toggle action which tends to hold the radial lugs 30 in locked position against a reinforcing plate 34. This occurs because the first connection between the radial lugs 30 and the links 31 is located forwardly in an over center position adjacent the plate 34 relative to the center line between the locking rod axis and the clevis connection with the link 31. The studs 32 are threaded into the movable gear plate 25 and pass through bearing holes 35 in the vertical slide box 10 with sufficient clearance between the studs 32 and the holes 35 to permit inward and outward movement of the gear plate 25.

A backing plate 36 forms the back wall of the rearwardly opening slideway 12 and provides a mounting surface for the reinforcing plate 34 which has mounting studs 37 for mounting two support brackets 38 welded to bearing 29. The lower end of the forwardmost channel section 24 is closed by a support plate 39 welded to the backing plate 36 and the bottom of the vertical slide box 11. The support plate 39 provides reinforcement for the backing plate 36 and the slide box 11 and prevents the movable gear plate 25 from dropping out of the slideway 12 if studs 32 are sheared off.

A lower safety stop plate 40, welded to bottom portions of the slide box 11, closes the lower opening of the rearward channel section 13 adjacent the support plate 39 to prevent the ball assembly 15 from dropping out of the lower opening of the channel section 13 when the movable gear plate 25 is disengaged from rack gear section 23.

An upper safety stop plate 41 covers the upper opening of the slideway 12 and is held in position by nuts 42 threaded on studs 43 passing through clearance holes 44 in the upper safety stop plate 41 and welded to the side walls 45 of the slideway 12. The function of the upper cover plate 41 is to permit repair and replacement of the ball assembly 15 and the movable gear plate 25 and also to prevent accidental release of the ball assembly 15 from the slideway 12.

A safety pin 46 is inserted in a safety pin hole 47 in the upper stop plate 41 and extends vertically through the forwardmost channel section 24 behind the movable gear plate 25 for the length of the gear plate to prevent accidental disengagement of the gear plate 25 from the rack gear section 23 while the hitch is in use.

As shown in FIGS. 1 and 5, a reinforcing and mounting plate 48 is welded to each of the opposite lateral edges 49 of the backing plate 36 and to adjacent ends 50 of the support plate 39 to reinforce the quick change hitch and to provide support structure for a conventional mounting assembly 51 which attaches the hitch to the towing vehicle. As illustrated, the mounting assembly 51 may take the form of cylindrical sleeves or tubes 51a to which upper portions of the plates 48 are welded adapted to telescopically fit in cylindrical frame members of the tractor or towing vehicle and be coupled thereto by coupling pins inserted through registering holes in the tubes 51a and frame members. Alternatively, the quick change hitch 10 may be welded to the frame of the towing vehicle or attached by any other convenient means.

Two pairs of reinforcing brackets or gusset plates 52 and 53 are welded to side walls 45 and backing plate 36 to reinforce the vertical slide box 11.

In operation, the drop safety pin 46 is removed and the handle 28 shown in FIG. 3 is rotated to the unlocked position shown in FIG. 4 causing the radial lugs 30 to retract the locking links 31 and the studs 32, thereby disengaging the movable gear plate 25 from the rack gear section 23. The ball assembly 15 is then free to be moved up or down to the desired position after which the handle 28 is rotated to the locked position and the drop safety pin 46 is reinserted in hole 47.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the dependent claims.

I claim:

1. A trailer hitch comprising a hitch ball assembly including a hitch ball assembled to a guide member having opposite rectilinear vertical guide rail formations and a laterally facing vertically elongated rack gear formation, a channel means defining a vertical guide channel for accommodating vertical sliding movement of said guide rail formations and said rack gear formation including means defining guide grooves for receiving said rail formations, a gear plate in the rail guide channel movable transversely in said channel into and out of engagement with the rack gear formation, and a means for locking the movable gear plate in engagement with the rack gear formation when the hitch ball assembly has been positioned at the desired height.

2. A vertically adjustable trailer hitch as defined in claim 1 wherein said means for locking the movable gear plate comprises a toggle action locking means.

3. A vertically adjustable trailer hitch as defined in claim 2 wherein said toggle action locking means comprises more than one stud bolt fixed to the movable gear plate, a clevis attached to one end of each respective stud blot, locking links connected to the clevises, a pivot bearing mounted on the channel means, and a hand lever pivoted in the pivot bearing and having fixed radial lugs which are connected to the locking links at the end opposite the clevises.

4. A vertically adjustable trailer hitch as defined in claim 1, including a safety device means for preventing a movable gear plate from becoming disengaged from the rack gear formation unless the safety device is released.

5. A vertically adjustable trailer hitch as defined in claim 1, including a backing plate forming a back wall of the channel means and a support plate fixed to a lower edge of the backing plate and closing a lower end of the channel means.

6. A vertically adjustable trailer hitch as defined in claim 1, including a safety pin means insertable behind the movable gear plate for preventing disengagement of the movable gear plate with the rack gear formation except when the safety pin means is removed.

7. A hitch as defined in claim 6, including an upper safety stop plate means removably attachable to the upper end of the channel means for covering the upper end to prevent accidental removal of the hitch ball assembly.

8. A vertically adjustable trailer hitch as defined in claim 1, wherein said channel means comprises a vertical slide box defining a rearwardly opening slideway having a rearmost channel portion and a forwardmost channel portion communicating therewith, said guide member including a supporting plate for said hitch ball occupying said rearmost channel portion having a pair of vertical edges forming said guide rail formation slidably interfitted in said guide grooves, said rack gear extending integrally forwardly from said supporting plate into said forwardmost channel portion, and said gear plate being wholly located in said forwardmost channel portion and being movable transversely therein.

9. A vertically adjustable hitch as defined in claim 8, including a safety pin means removably positioned between said gear plate and a side wall of said slide box of sufficient thickness to prevent retracting movement of the gear plate from intermeshing relation with the rack gear formation for preventing disengagement of the movable gear plate with the rack gear formation except when the safety pin means is removed.

10. A vertically adjustable trailer hitch comprising a backing plate; a vertical slide box defining a rearwardly opening slideway positioned centrally of the backing plate and having a rearward channel section and a forward channel section communicating with the rearward channel section; a rack gear section having a slide plate which slides vertically in the rearward channel section of the vertical slide box, a ball stand plate portion extending perpendicular to the slide plate portion; a bracing bracket joining the slide plate and the ball stand plate portion; a hitch ball mounted on the ball stand plate portion; a gear plate movable horizontally within said forward channel in the vertical slide box and engageable with the rack gear section; a support plate fixed to a lower edge of the backing plate and closing a lower end of the vertical slide box; two stud bolts spaced vertically apart and fixed to the movable gear plate; a clevis mounted on one end of each respective stud bolt; locking links connected to the clevises; a pivot bearing mounted on the backing plate; and a hand lever pivoted in the pivot bearing and having fixed radial lugs which are connected to the locking links at the end opposite the clevises.

* * * * *